(12) United States Patent
Agapi et al.

(10) Patent No.: US 7,920,681 B2
(45) Date of Patent: Apr. 5, 2011

(54) SYSTEM, APPARATUS, AND METHODS FOR CREATING ALTERNATE-MODE APPLICATIONS

(75) Inventors: Ciprian Agapi, Lake Worth, FL (US); Felipe Gomez, Weston, FL (US); James R. Lewis, Delray Beach, FL (US); Gary J. Pietrocarlo, Deerfield Beach, FL (US); Wallace J. Sadowski, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 1005 days.

(21) Appl. No.: 10/982,491

(22) Filed: Nov. 5, 2004

(65) Prior Publication Data

US 2006/0112063 A1 May 25, 2006

(51) Int. Cl.
*H04M 11/00* (2006.01)
(52) U.S. Cl. ..................................... 379/88.16; 709/205
(58) Field of Classification Search ................ 379/88.12, 379/88.13, 88.16, 88.14, 210.01; 709/205
See application file for complete search history.

(56) References Cited

U.S. PATENT DOCUMENTS

| | | | |
|---|---|---|---|
| 6,983,307 B2 * | 1/2006 | Mumick et al. ............... | 709/205 |
| 7,233,655 B2 * | 6/2007 | Gailey et al. ............. | 379/210.01 |
| 7,272,564 B2 * | 9/2007 | Phillips et al. ............. | 704/270.1 |
| 2002/0032564 A1 * | 3/2002 | Ehsani et al. .................. | 704/235 |
| 2002/0129060 A1 | 9/2002 | Rollins et al. | |
| 2003/0023953 A1 | 1/2003 | Lucassen et al. | |
| 2003/0040912 A1 | 2/2003 | Gilde et al. | |
| 2003/0064716 A1 * | 4/2003 | Gailey et al. .................. | 455/414 |
| 2003/0071833 A1 | 4/2003 | Dantzig et al. | |
| 2003/0093419 A1 | 5/2003 | Bangalore et al. | |
| 2003/0097265 A1 | 5/2003 | Sakai et al. | |
| 2003/0162561 A1 | 8/2003 | Johnson et al. | |
| 2003/0182125 A1 | 9/2003 | Phillips et al. | |
| 2003/0182622 A1 | 9/2003 | Sibal et al. | |
| 2003/0221158 A1 | 11/2003 | Ativanichayaphong | |
| 2004/0025115 A1 | 2/2004 | Sienel et al. | |

FOREIGN PATENT DOCUMENTS

EP 1100013 5/2001

* cited by examiner

*Primary Examiner* — Curtis Kuntz
*Assistant Examiner* — Amal Zenati
(74) *Attorney, Agent, or Firm* — Novak Druce + Quigg LLP

(57) ABSTRACT

A system, apparatus, and method for creating alternate-mode interactive applications is provided. A system for creating an alternate-mode interactive application includes a selection module for selecting a voice-mode element from a set of voice-mode elements defining a voice-mode interactive application for accomplishing a predetermined user-directed task The system also includes a generation module for generating an alternate-mode element corresponding to the selected voice-mode element, the alternate-mode element having a modality different than the voice-mode element. The system further includes a construction module for constructing an alternate-mode interactive application based upon the generated alternate-mode element.

13 Claims, 5 Drawing Sheets

> Simulation
>
> One chocolate coming right up.
>
> [ < Back ] [ Next > ] [ Cancel ]

FIG. 3C

SYSTEM, APPARATUS, AND METHODS FOR CREATING ALTERNATE-MODE APPLICATIONS

BACKGROUND

1. Field of the Invention

The present invention is related to the field of computing devices, and, more particularly, to interactive applications for computer devices.

2. Description of the Related Art

A voice-mode interactive application is a type of modal application by which a user of a computing device can interact with the computing device through speech-based input and output. Accordingly, a voice-mode interactive application typically includes both a speech recognition component as well as a speech generation component. The speech recognition component allows the user to supply input to the computing device in the form of speech utterances. The speech generation component generates speech output in the form of pre-recorded voice playback and/or synthetic speech generated by a text-to-speech (TTS) device.

The voice-mode interactive application provides the grammar, sequence, context, and other parameters for the user carrying out an interactive dialog with the computing device. An interactive dialog is typically designed to accomplish a specific user-directed task or to perform a specific set of user-directed functions. These tasks and functions vary widely.

A voice mode interactive application offers several advantages, not the least of which is that a user does not necessarily need a keyboard or other non-voice input device to accomplish a task using the computing device. Nonetheless, there are circumstances in which a mode of interaction other than voice mode is desirable. For example, when the computing device is located in a noisy environment a user may prefer a visual mode to a voice mode.

Additionally, there are instances in which a user may prefer to use more than one mode. Applications that allow a user to interact with a computing device by supplying input and receiving output through a plurality of modalities are commonly referred to as multimodal applications. The different modalities that can be supported by a multimodal application include speech, audio, visual, graphical, textual, and other modalities. Multimodal applications, moreover, permit more than one modality to be active at any given time.

Relatively few efficient techniques currently exist for converting existing single modality applications into multimodal ones. Relatedly, there are few efficient techniques for transforming single modality applications customized for voice inputs and outputs to applications having a visual modality. It follows, therefore, that it would be advantageous to provide a way to create an alternate-mode application, whether founded in a single or multiple modality, for carrying out a user-directed task for which only a voice-mode application initially exists.

SUMMARY OF THE INVENTION

The present invention provides a system, apparatus, and related methods for creating an alternate-mode interactive application for a computing device. The system, according to one embodiment, can include a selection module for selecting at least one voice-mode element and a generation module for automatically generating at least one alternate-mode element corresponding to the selected voice-mode element. The system further can include a construction module for constructing an alternate-mode interactive application based upon the generated alternate-mode element.

The system, according to another embodiment, can include a selection module that selects a voice-mode element from among one or more voice-mode elements that form a voice-mode interactive application that is configured to accomplish a predetermined user-directed task. The system can also include a generation module for automatically generating at least one alternate-mode element corresponding to the selected voice-mode element. The system further can include a construction module for constructing an alternate-mode interactive application based upon the generated alternate-mode element, wherein the alternate-mode interactive application can have a modality different from the voice-mode application, but be capable of accomplishing the same predetermined user-directed task as the voice-mode application defined by the set of voice-mode elements.

Method aspects of the present invention include a method for creating an alternate-mode application. The method can include selecting a voice-mode element. The method also can include generating at least one alternate-mode element corresponding to the selected voice-mode element, the alternate-mode element having a different modality from the voice-mode element. The method further can include constructing an alternate-mode application based upon the generated alternate-mode element.

An apparatus according to another embodiment of the invention can comprise a computer-readable storage medium comprising computer instructions for creating an alternate-mode application. The computer instructions can include instructions for selecting at least one voice-mode element from a set of voice-mode elements defining a voice-mode application for accomplishing a predetermined user-directed task. The computer instructions also can include a computer instruction for generating at least one alternate-mode element corresponding to the selected voice-mode element, wherein the alternate-mode element has a different modality from the voice-mode element. The computer instructions further can include a computer instruction for constructing an alternate-mode application based upon the generated alternate-mode element.

BRIEF DESCRIPTION OF THE DRAWINGS

There are shown in the drawings, embodiments which are presently preferred, it being understood, however, that the invention is not limited to the precise arrangements and instrumentalities shown.

FIG. 3C is a pictorial representation of still another graphical user interface dialog box generated by the alternate-mode application created according to one embodiment of the present invention.

DETAILED DESCRIPTION OF THE INVENTION

Figure 1:
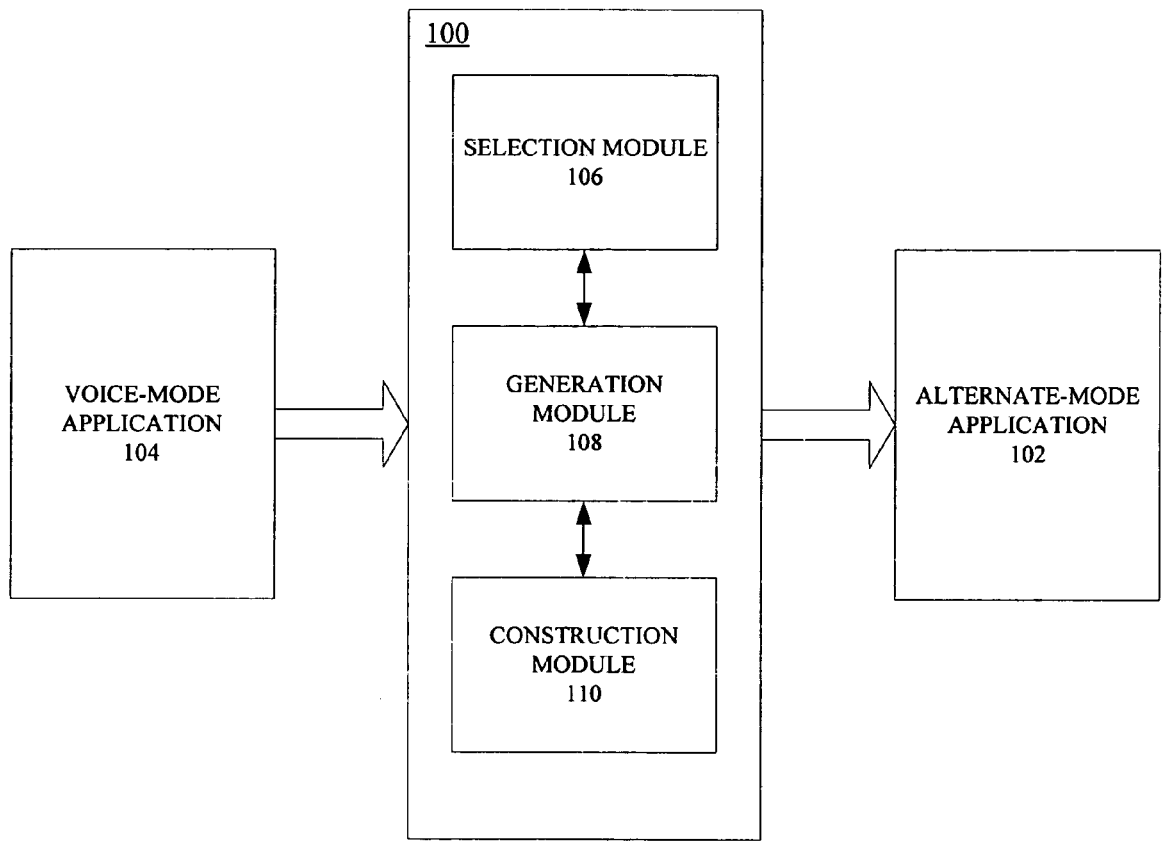
FIG. 1 is a schematic diagram of a system for creating an alternate-mode application according to one embodiment of the present invention.

FIG. 1 provides a schematic diagram of a system 100 for creating an interactive application, according to one embodiment of the present invention. The interactive application, more particularly, comprises an alternate-mode interactive application 102 that the system 100 creates by selecting one or more voice-mode elements and automatically generating at least one alternate-mode element. Each alternate-mode element corresponds to a selected voice-mode element and has a different modality from its corresponding voice-mode element. From the one or more alternate-mode elements so generated, the system 100 constructs the alternate-mode interactive application 102.

The alternate-mode interactive application 102 illustratively corresponds to a voice-mode interactive application 104, the voice-mode interactive application comprising a plurality of voice-mode elements that the system 100 selects from in creating the alternate-mode interactive application. As used herein, the term interactive application denotes a set of one or more software-based instructions for enabling a user of a computing device (not shown) to accomplish a task or to perform one or more functions by interacting with the computing device in accordance with the software-based instructions. In this sense, both the voice-mode application 104 and the created alternate-mode application 102, which as described herein has a different modality than the voice-mode application, serve as interfaces between the user and a computing device for accomplishing a predetermined, user-directed task. The computing device can be a general-purpose computer, such as a personal computer (PC) or a special-function computer such as a server. The computing device alternatively can be a personal digital assistant (PDA), cell phone, or other type of device capable of processing computer-based instructions and data.

The voice-mode interactive application 104 is an application that enables user-machine dialog or exchange based upon human speech. Speech-based inputs and outputs facilitated by the voice-mode interactive application 104 include, for example, text-to-speech (TTS) conversion, synthesized speech output, digitized audio processing, speech recognition, recognition of dual tone multi-frequency (DTMF) key input, and the recording of speech input. As will be readily understood by one of ordinary skill in the art, the voice-mode interactive application 104 can be written using various language forms, including languages in script form. A particularly useful language form for writing the voice-mode application 104 is VoiceXML, an extensible Markup Language (XML) that has rapidly emerged as a standard for various voice-mode applications. The following code typifies a voice-mode application. The code provides a VoiceXML rendering of a user-vendor dialog in which the user interacts with a voice server in ordering a particular flavor of ice cream from an automated ice cream vendor:

```
<?xml version="1.0" encoding="iso-8859-1"?>
<!DOCTYPE vxml PUBLIC "-//W3C//DTD VOICEXML 2.0 //EN"
"vxml120-115.dtd">
<vxml xmlns="http://www.w3.org/2001/vxml" version="2.0">
    <!--begin Call Flow-->
<property name="audiomaxage" value="1" />
<var name="mode" expr="'speech'"/>
<form id="S00010">
    <block>
        <audio src="./iceCream%20audio/S00010.wav">Welcome to the virtual Ice Cream Shop.</audio>
        <goto next = "#P00010"/>
    </block>
</form>
<var name="vfP00010">
<form id="P00010">
    <field name="fP00010">
    <prompt cond="mode = = 'speech'">
        <audio src="./iceCream%20audio/P00010s.wav">What flavor would you like?</audio>
    </prompt>
    <option value="Chocolate">Chocolate</option>
    <filled>
        <assign name="vfP00010" expr="fp00010"/>
        <if cond="fP00010= ='Chocolate'">
            <goto next="S00020"/>
            <elseif cond="fP00010= ='Vanilla'"/>
            <goto next="#S00030"/>
        </if>
    </filled>
</form>
<form id="S00020">
    <block>
        <audio src="./iceCream%20audio/S00020.wav">One chocolate coming right up?</audio>
    </block>
</form>
<!--End Call Flow-->
</vxml>
```

The dialog rendered by the exemplary VoiceXML application begins with the synthetic generation of speech welcoming the user to the virtual ice cream shop. This is followed by a prompt asking whether the user would like chocolate or vanilla ice cream. The user responds with a speech utterance voicing a choice of flavors, and, based upon the user response, a second synthetic speech generation confirms the choice (i.e., chocolate). The code directs the handling of the user's speech utterance by a speech recognition device that is part of the voice server used to support the exemplary VoiceXML application.

As illustrated by this exemplary VoiceXML application, the voice-mode interactive application 104 comprises a set of one or more voice-mode elements. An element comprises a function, statement, prompt, input field, presentation field, or similar software-based component for effecting the particular user-directed task for which the voice-mode interactive application 104 is designed to accomplish. The exemplary VoiceXML application, more particularly, illustrates various VoiceXML elements for effecting the virtual ice cream shop dialog, including the begin and end Callflow statements, assignment and goto functions, as well as the speech recognition and audio rendering functions that make up the dialog.

As noted, above, FIG. 1 illustrates a particular embodiment according to which the alternate-mode interactive application 102 generated is based upon the voice-mode interactive application 104. The alternate-mode interactive application 102 is an application for performing the same user-directed application as the voice-mode interactive application 104, albeit in a modality different from that of the voice-mode application upon which it is based. According to one embodiment, the alternate-mode interactive application 102 comprises a visual-mode application. According to yet another embodiment, the alternate-mode interactive application 102 comprises a multimodal application, such as a multimodal wizard interface. As will be readily apparent from the ensuing discussion, the system 100 can be employed to create still other interactive applications having different modalities.

The system 100 illustratively includes a selection module 106, a generation module 108, and a construction module 110, each of the modules being communicatively linked with the others to effect the creation of the alternate-mode interactive application 102. Each of the modules can be implemented as a set of software-based instructions configured to run on a computing device, including a general-purpose computer, such as PC, a special-function computer, such as a server, a PDA, cell phone, or similar type device. Alternately, one or more of the modules of the system 100 can be implemented in dedicated circuitry comprising, for example, logic gates and memory, as will be readily understood by one of ordinary skill in the art. Each of the modules of the system 100 alternately can be implemented through a combination of software-based instructions and dedicated hardwire circuitry.

The selection module 106 illustratively selects one or more voice-mode elements, the voice-mode elements being selected from the set of one or more such elements that define the voice-mode interactive application 104. For each voice-mode element selected, the generation module 108 generates at least one alternate-mode element corresponding to the selected voice-mode element.

An alternate-mode element generated by the generation module 108, though corresponding to one of the voice-mode elements that defines the voice-mode interactive application 104, is generated so as to have a different modality from the voice-mode element. More particularly, each alternate-mode element will be generated by the generation module 108 to have the modality intended for the alternate-mode interactive application 102. That is, if the alternate-mode interactive application 102 is to comprise a visual-mode application, for example, then the generation module 108 generates alternate-mode elements having a visual modality. Instead, if the alternate-mode interactive application 102 is to comprise, for example, a multimodal application, then the generation module 108 generates multimodal elements.

Using the alternate-mode elements generated by the generation module 108, the construction module 110 constructs the alternate-mode interactive application 102. The alternate-mode interactive application 102 constructed by the construction module 110 is based upon the one or more alternate-mode elements generated by the generation module 108 and, as already noted, has a modality different from the voice-mode interactive application 104 on which it is based. As also noted previously, the modality of the alternate-mode interactive application 102 can be constructed as a visual-mode application. Alternatively, the alternate-mode interactive application can be constructed by the construction module 110 as a multimodal application. As a multimodal application, the constructed alternate-mode interactive application 102 can provide, for example, both a visual modality as well as a voice modality for accomplishing the predetermined user-directed task. The multimodal application can alternately or additionally provide for user-machine interactions via other modalities as well.

Constructed as a multimodal application, therefore, the alternate-mode interactive application 102 provides for user interactions via a variety of input modes. Accordingly, the alternate-mode interactive application 102 generated by the construction module 110 can, for example, accept and process input in the form of speech as well as input in graphical or visual form inputted using a keyboard or point-and-click device such as a computer mouse. Other input forms handled by the alternate-mode interactive application 102 include, for example, handwriting recognition, Dual Tone Multiple Frequency (DTMF) processing, and the like. Similarly, as a multimodal application, the alternate-mode interactive application 102 can provide recorded and synthesized speech output played, for example, through an audio-output device, as well as visual output that can be displayed, for example, upon a computer terminal screen or similar such device. The alternate-mode interactive application 102, constructed as a multimode application, also permit users to interact with a computing device using various combinations of input and/or output forms, such as by using both a graphical user interface (GUI) as well as speech modes for performing a single user-directed task.

In multimodal form, the alternate-mode interactive application 102, can be particularly useful for small computing devices for which data entry via a keyboard is more difficult than input in the form of speech. Moreover, environmental conditions can cause one interface modality afforded by a multimodal application to be preferred over another. For example, in a noisy environment input via a keypad and/or handwriting stylus can be preferred to input via voice-mode. Furthermore, in an environment having adverse visual conditions, such as darkness or inordinate glare, it may be difficult to use a computer terminal screen associated with a computing device, in which case speech output can be preferred to visual output.

According to one embodiment, the alternate-mode interactive application 102 is constructed by the construction module 110 using a graphical call flow builder. The graphical call flow builder can comprise the IBM Graphical Callflow Builder by International Business Machines Corporation of Armonk, N.Y. A call flow builder provides a graphics-based tool for modeling, prototyping, and simulating various applications. By implementing a graphical call flow builder, the construction module 110 enables an application designer to create the alternate-mode application 102 by "dragging and dropping elements" that are desired for creating the "call flow," or dialog sequence of a particular application. Having created the call flow, the graphical call flow builder implemented by the construction module 110 allows the application designer to then construct the desired application by selecting a command from the context menu of the call flow builder. Implementation of the construction module 110 using a call flow builder further permits the simulation of the alternate-mode application 102 using features common to the call flow builder, as will be readily understood by one of ordinary skill in the art.

Figure 2:
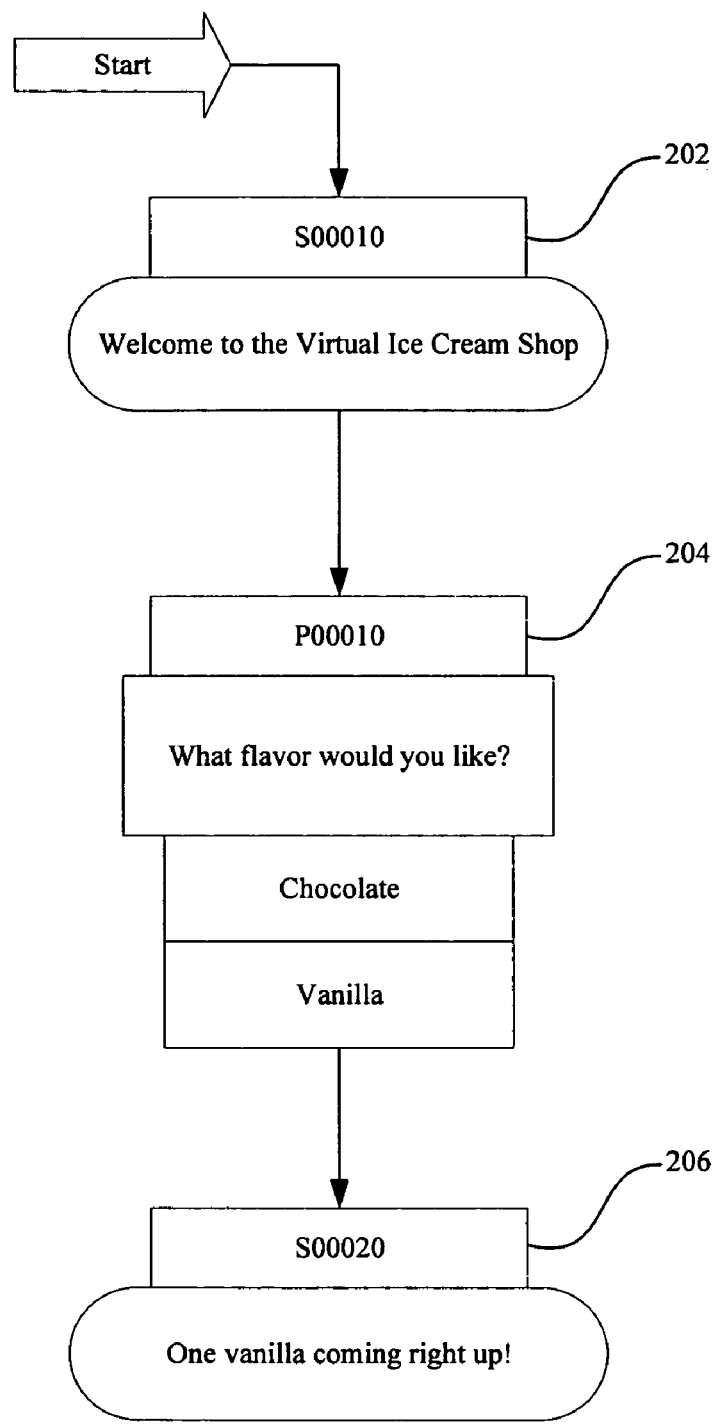
FIG. 2 is a schematic diagram of a call flow of an exemplary application that can provide a basis for an alternate-mode application created according to one embodiment of the present invention.

An illustration of how the system 100 creates the alternate-mode interactive application 102 by implementing a graphical call flow builder can be provided by referring again to the earlier example of the virtual ice cream shop. FIG. 2 provides a schematic diagram of the call flow corresponding to the voice-based modality of the underlying virtual ice cream shop application. As illustrated, synthesized speech welcoming a customer to the virtual ice cream shop is provided in accordance with step 202. At step 204, the customer is asked what flavor he or she would like. The user response, in the form of a speech utterance, is the user's indication of which ice cream flavor is desired. The user's selection is confirmed at step 206 with another rendering of synthesized speech telling the customer that one scoop of chocolate will be forthcoming.

Figure 3A:
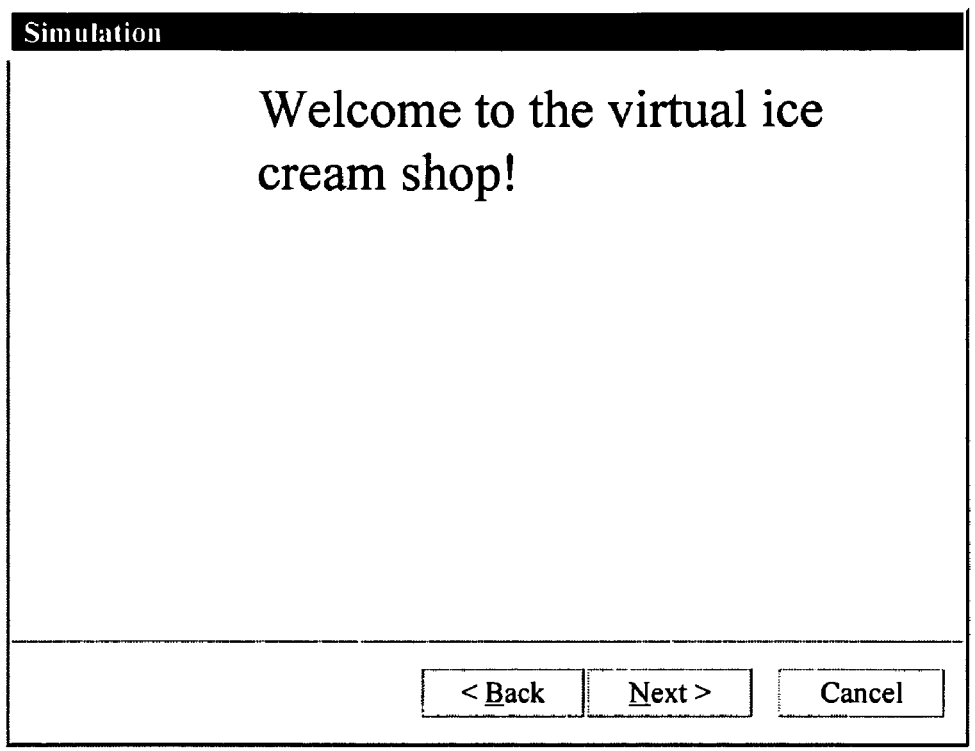
FIG. 3A is a pictorial representation of a graphical user interface dialog box generated by an alternate-mode application created according to one embodiment of the present invention.
Figure 3B:
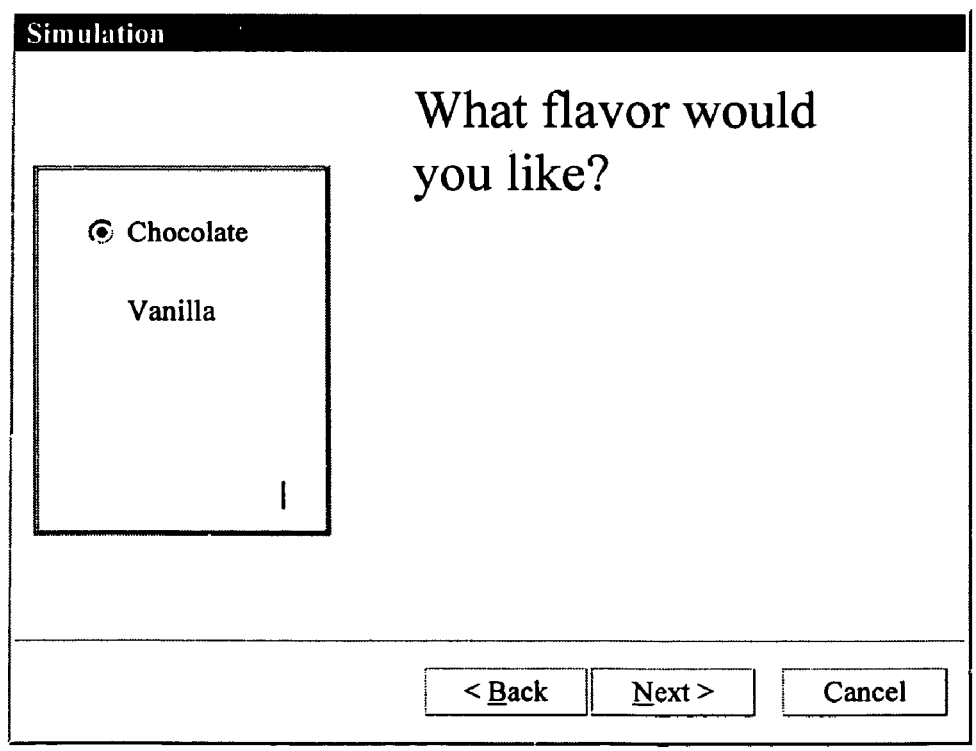
FIG. 3B is a pictorial representation of another graphical user interface dialog box generated by the alternate-mode application created according to one embodiment of the present invention.

Continuing with this example, the system 100 provides an application for performing the same user-directed task (i.e., selecting and ordering a particular flavor of ice cream from a virtual vendor), but with a different modality. In the present example, the modality of the alternate-mode interactive application 102 is visual. FIG. 3A illustrates a visual instantiation provided by the alternate-mode interactive application 102. The visual instantiation is a dialog box which graphically welcomes the customer to the virtual ice cream shop. FIG. 3B illustrates another visual instantiation provided by the alternate-mode interactive application 102, this one being the counterpart of the voice-mode prompt instructing the customer to choose an ice cream flavor. The alternate-mode interactive application 102 offers a selection via a dialog box, and the customer provides a graphical response by a point-and-click selection from that dialog box. FIG. 3C shows the visual instantiation of the confirmation of the customer's selection. The running of the dialog can be simulated, as illustrated in FIGS. 3A-3C, using features standard to a call flow builder, as noted above.

As described above, the alternate-mode interactive application 102 constructed by the construction module 110 is constructed from the elements generated by the generation module 108, where the generation module generates at least one alternate-mode element for each voice-mode element selected by the selection module 106. The following table, TABLE 1, more generally illustrates how the generation module 108 generates a set of multimodal wizard elements that can be used by the construction module 110 to create a multimodal wizard application. As illustrated, the multimodal wizard elements are generated from elements corresponding to the user interface (UI) constructs of a graphical call flow builder:

TABLE 1

| Graphical Callflow Builder UI Construct | Multimodal Wizard |
|---|---|
| Statement | text panel with standard wizard controls |
| Prompt with < x choices | text plus radio button choices |
| Prompt with >= choices | text plus drop-down control |
| Prompt with diction/spelling/numeric grammar | text plus free-form text entry field |
| Global commands (e.g., "Start Over") | additional buttons in wizard |

According to still another embodiment, the generation module 108 generates alternate-mode elements corresponding to voice-mode elements by transcoding voice-mode elements. The following tables, TABLE 2 and TABLE 3, respectively, illustrate the transcoding of elements comprising VoiceXML UI and non-UI constructs. The transcoded elements give rise to corresponding multimodal elements, as shown in the tables, for constructing a multimodal wizard.

TABLE 2

| VoiceXML 2.0 UI Construct | Multimodal Wizard |
|---|---|
| TTS-playable text in block | text panel with standard wizard controls |
| TTS-playable text in menu with < x choices | text plus radio button choices |
| TTS-playable text in menu with >= x choices | text plus drop-down control |
| TTS-playable text in field with < x choices | text plus radio button choices |
| TTS-playable text in field with >= x choices | text plus drop-down control |
| TTS-playable text in field for diction/spelling/numeric entry | text plus free-form text entry field |
| link commands (e.g., "Start Over") | additional buttons in wizard |

TABLE 3

| VoiceXML 2.0 non-UI Construct | Multimodal Wizard |
|---|---|
| assign | provide same function |
| audio | ignore (provide transcoding setting to play) |
| break | ignore unless playing prompts via TTS |
| catch | provide same function |
| clear | provide same function |
| disconnect | ignore |
| else | provide same function |
| elseif | provide same function |
| error | provide same function OR could cause display of additional wizard panel if contains prompt |
| exit | provide same function |
| filled | use to determine branching paths and other computation |
| goto | provide same function |
| help | cause display of additional wizard panel IF contains prompt |
| if | provide same function |
| initial | use to determine first wizard panel |
| log | provide same function |
| meta | provide same function |
| meta-data | provide same function |
| noinput | ignore timing aspect - cause display of additional wizard IF contains prompt |
| nomatch | cause display of additional wizard panel IF contains prompt |
| object | provide same function |
| param | provide same function |
| property | ignore |
| record | provide same function |
| reprompt | provide same function - cause display of additional wizard panel IF contains prompt |
| return | provide same function |
| script | provide same function |
| subdialog | transcode subdialog |
| submit | provide same function |
| throw | provide same function |
| transfer | provide transcoding option for handling transfer via alternative goto |
| value | provide same function |
| var | provide same function |

Although the above examples are couched in terms of voice-mode applications written in VoiceXML, it should be emphasized that, as already noted, the voice-mode interactive application 104 alternatively can be written in other languages used for rendering voice-mode applications.

Figure 4:
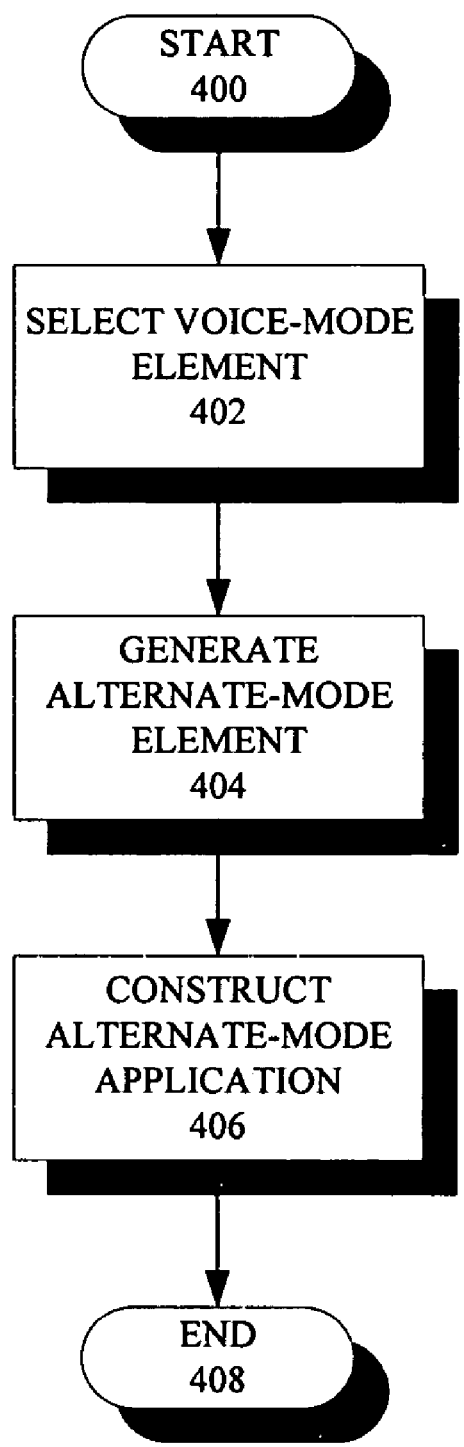
FIG. 4 is a flowchart of a method of creating an alternate-mode application according to another embodiment of the present invention.

FIG. 4 provides a flowchart illustrating a method 400 for creating an application according to a method aspect of the invention. The method 400 illustratively includes, at step 402, selecting one or more voice-mode elements, the elements being selected from a set comprising one or more voice-mode elements, the set defining a voice-mode interactive application for accomplishing a predetermined user-directed task. The method 400 further illustratively includes generating at least one alternate-mode element corresponding to the selected voice-mode element at step 404. As with respect to the system described above, the alternate-mode elements generated according to the method 400 each have a different modality from the voice-mode elements to which each corresponds.

Additionally, at step 406, the method 400 illustratively includes constructing an alternate-mode interactive application, wherein the alternate-mode interactive application is based upon the alternate-mode elements generated at step 404. The alternate-mode interactive application created according to the method 400 has a different modality than the voice-mode interactive application but is capable of accomplishing the same predetermined, user-directed task.

As described herein, the present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be, as noted above, a general-purpose computer system with a computer program that, when being loaded and executed, controls the computer system such that it carries out the methods described herein.

The present invention also can be embedded in a computer program product, which comprises all the features enabling the implementation of the methods described herein, and which, when loaded in a computer system, is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-based method for automatically creating a non-voice-mode only interactive application from a voice-mode only interactive application, the method comprising:
    providing a voice-mode only interactive application having a set of voice-mode elements, the set of voice-mode elements defining the voice-mode only interactive application for accomplishing a predetermined user-directed task;
    representing the voice-mode only interactive application as a call flow using a graphical call flow builder, each voice-mode element of the set of voice-mode elements including at least one among a function, statement, prompt, input field, and presentation field that performs a step of the task using a voice-mode output or based upon a voice-mode user supplied input;
    automatically generating a non-voice-mode element corresponding to each voice-mode element, and wherein the non-voice-mode element comprises at least one among a function, statement, prompt, input field, and presentation field that performs a corresponding step of the task using a non-voice-mode output or based upon a non-voice-mode user-supplied input; and
    constructing a non-voice-mode only interactive application using the graphical call flow builder, wherein the non-voice-mode only interactive application comprises a set of non-voice-mode elements consisting of the generated non-voice-mode element for each voice-mode element, wherein the non-voice-mode only interactive application constructed is capable of accomplishing the same predetermined user-directed task.

2. The method of claim 1, wherein the constructed non-voice-mode interactive application comprises a multimodal interface.

3. The method of claim 1, wherein the non-voice-mode element comprises a visual-mode element.

4. The method of claim 1, further comprising simulating the non-voice-mode only interactive application constructed using the graphical call flow builder.

5. The method of claim 1, wherein generating comprises transcoding the voice-mode element.

6. A computer-based system for automatically creating a non-voice-mode only interactive application from a voice-mode only interactive application, the system comprising:
    at least one memory; and
    at least one processor configured to:
        represent a voice-mode only interactive application as a call flow using a graphical call flow builder, the voice-mode only interactive application having a set of voice-mode elements, the set of voice-mode elements defining the voice-mode only interactive application for accomplishing a predetermined user-directed task, each voice-mode element of the set of voice-mode elements including at least one among a function, statement, prompt, input field, and presentation field that performs a step of the task using a voice-mode output or based upon a voice-mode user supplied input;
        automatically generate a non-voice-mode element corresponding to each voice-mode element, and wherein the non-voice-mode element comprises at least one among a function, statement, prompt, input field, and presentation field that performs a corresponding step of the task using a non-voice-mode output or based upon a non-voice-mode user-supplied input; and
        construct a non-voice-mode only interactive application using the graphical call flow builder, wherein the non-voice-mode only interactive application comprises a set of non-voice-mode elements consisting of the generated non-voice-mode element for each voice-mode element, wherein the non-voice-mode only interactive application constructed is capable of accomplishing the same predetermined user-directed task.

7. The system of claim 6, wherein the constructed non-voice-mode interactive application comprises a multimodal interface.

8. The system of claim 6, wherein the non-voice-mode element comprises a visual-mode element.

9. The system of claim 6, wherein the non-voice-mode interactive application constructed is simulated using the graphical call flow builder.

10. The system of claim 6, wherein the non-voice-mode element is generated by transcoding the voice-mode element.

11. A computer-readable storage medium, having stored thereon a computer program having a plurality of code sections executable by a computer for causing the computer to perform the steps of:
    providing a voice-mode only interactive application having a set of voice-mode elements, the set of voice-mode elements defining the voice-mode only interactive application for accomplishing a predetermined user-directed task;
    representing the voice-mode only interactive application as a call flow using a graphical call flow builder, each voice-mode element of the set of voice-mode elements including at least one among a function, statement, prompt, input field, and presentation field that performs a step of the task using a voice-mode output or based upon a voice-mode user supplied input;
    automatically generating a non-voice-mode element corresponding to each voice-mode element, and wherein the non-voice-mode element comprises at least one among a function, statement, prompt, input field, and presentation field that performs a corresponding step of the task using a non-voice-mode output or based upon a non-voice-mode user-supplied input; and constructing a non-voice-mode only interactive application using the graphical call flow builder, wherein the non-voice-mode only interactive application comprises a set of non-voice-mode elements consisting of the generated non-voice-mode element for each voice-mode element, wherein the non-voice-mode only interactive application constructed is capable of accomplishing the same predetermined user-directed task.

12. The computer-readable storage medium of claim 11, wherein the constructed non-voice-mode interactive application comprises a multimodal interface.

13. The computer-readable storage medium of claim 11, wherein the non-voice-mode element comprises a visual-mode element.

* * * * *